Oct. 15, 1935.                O. WITTEL                2,017,138
              EASILY THREADED FILM MOVING ASSEMBLY
                        Filed Jan. 11, 1935
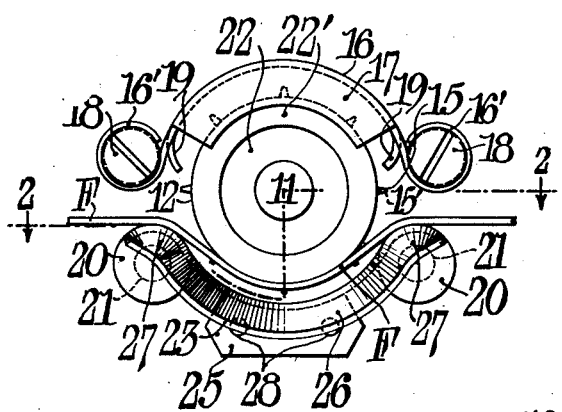
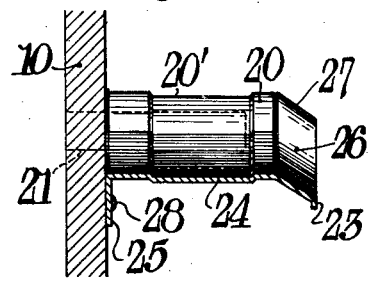
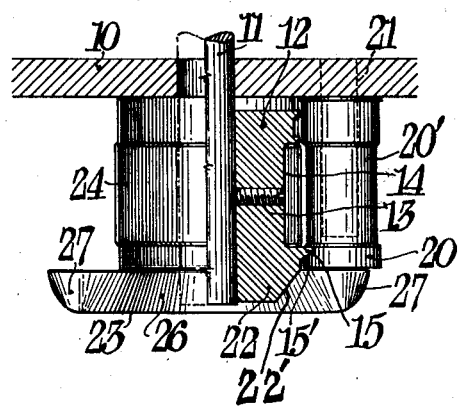
Inventor:
Otto Wittel,
Newton M. Perrins.
By George A. Gillette, Jr.
Attorneys.

Patented Oct. 15, 1935

2,017,138

UNITED STATES PATENT OFFICE 2,017,138

EASILY THREADED FILM MOVING ASSEMBLY

Otto Wittel, Rochester, N. Y., assignor to Eastman Kodak Company, Rochester, N. Y., a corporation of New York Application January 11, 1935, Serial No. 1,373

7 Claims. (Cl. 271—2.3)

The present invention relates to improvements in a film moving assembly and more particularly to a film sprocket with related film guides which facilitate threading of film onto the sprocket.

In the threading of motion picture apparatus, considerable time and much inconvenience are encountered in placing the film in proper relation to the film moving means such as one or more film sprockets. Many devices for facilitating this threading operation are known but the majority of them require some automatic co-operation and movement of the film guides during or after threading.

The primary object of the present invention is the provision in a film moving assembly of a pair of guide members so formed and arranged that mere lateral or edgewise movement of the film toward the film moving means or sprocket will deform the film and conduct it into proper position and into engagement with a feeding drum or sprocket.

Another object of the invention is the provision of a pair of guide members for a film moving assembly, one of said guide members being located at the end of a feed drum or sprocket and the other of said guide members being stationary and formed to direct the edge of the film against the first mentioned guide member and to deform the film so that it may be readily located around the periphery of the feeding drum.

A further object of the invention is the provision of a pair of guide members, one of which has guiding surfaces sloped toward the periphery of the feeding drum and the other of which also has a guide surface sloping in the opposite direction to that on the first mentioned guide member but also for guiding the edge of the film toward the periphery of the feeding drum.

Still another object of the invention is the provision in a sprocket assembly of a plurality of guide rolls which are axially movable but which are prevented from moving axially by portions of a stationary guide member which also assist in deforming the film for location around the sprocket.

Other and further objects of the invention will be suggested to those skilled in the art by the following disclosure.

The aforementioned objects are attained in a film moving assembly, including a feeding drum, by the provision of a pair of guide members mounted adjacent the feeding drum, one of said members having a sloping guiding surface and being located at the end of the feeding drum, and the other of said guide members having sloping surfaces inclined opposite to that of the first mentioned guide member but also for guiding the edge of the film toward and around the periphery of said feeding drum. Said film moving assembly may include guide rollers which are mounted on pins and which may move axially. According to the invention one or more portions of the second mentioned guide member abut the ends of said rollers and prohibit axial movement of them.

Reference is hereby made to the accompanying drawing, in which similar reference characters designate similar elements and in which:

Fig. 1 is an end elevation of a film moving assembly including a feeding drum such as a film sprocket.

Fig. 2 is a horizontal section through said film moving assembly and is taken on the line 2—2 of Fig. 1.

Fig. 3 is a vertical section through the stationary guide member and showing its relation to one of the guide rollers.

In the illustrated embodiment of the invention the guide members are shown and described in conjunction with a toothed film sprocket but it is to be understood that the guide members of the invention may be employed with equal advantage in connection with a feeding drum making only frictional engagement with the film.

The film moving assembly of the invention is mounted upon a motion picture apparatus which includes a support 10. A shaft 11 is journaled in support 10 and carries the sprocket 12 which is fastened to said shaft by a set-screw 13. The sprocket 12 may be undercut or recessed by the provision of a peripheral groove 14, see Fig. 2. Sprocket teeth 15 may be provided circumferentially around one edge of the sprocket 12 and may have their outer edges 15' beveled or inclined as also shown in Fig. 2. The standard practice at the present time is to provide a slight inclination on the side edges of sprocket teeth, such inclination being for the purpose of guiding the tooth into the film perforations and is only a few degrees from a perpendicular plane through the sprocket. The inclination of these outer edges 15' of the sprocket teeth 15 according to the present invention is much greater and is such that the film may be moved axially toward the sprocket and these inclined edges will cam the edge of the film over the teeth 15. Obviously the inclination of the teeth as usually employed is not sufficient to perform this camming or guiding function upon edgewise or lateral movement of the film with respect to the sprocket. As shown in Fig. 2, this inclination of the outer edges 15' of the sprocket teeth 15 is approximately 45° from a perpendicular plane through the axis of the sprocket 12.

An arrangement to prevent threading of the film upon the wrong side of the feeding drum and to strip the film from the sprocket may be included in the assembly. The guard plate 16 has an overhanging flange 17 which prevents threading the film to the upper side of the sprocket 12. Eyelets 16' may be provided at the ends of guard plate 16 and may encircle a pair of studs 18 which are fastened into the support 10. Pins 19 project from guard plate 16 and function to strip the film from the sprocket teeth 15.

Some additional supporting means must be provided to hold the film in contact with the feeding drum. For this purpose a pair of guide rollers 20 are mounted upon pins 21 which extend into support 10. The guide rollers 20 rotate freely on said pins 21 and may also move axially thereon. The guide rollers 20 are located in a known relation with respect to the periphery of sprocket 12 and hold the film F against the periphery thereof, as best illustrated in Fig. 1. The guide rollers 20 may also be undercut in a known manner as illustrated at 20' in Figs. 2 and 3.

The elements of the film moving assembly, thus far described, are all of standard design and well-known construction. It is also well recognized that considerable time is lost and sometimes film perforations are broken in the location of the film F between the guide rollers 20 and the periphery of sprocket 12. The elements of the invention, now to be described, are provided for the purpose of facilitating this location of the film between the feeding drum 12 and the guide rollers 20. The illustrated embodiment of the invention includes a pair of guide members which have guiding surfaces so formed and arranged that the edge of the film strip is deformed by these guiding surfaces upon lateral or edgewise movement of the film with respect to the feeding drum.

One such guide member 22 may be provided at the end of sprocket 12. Said guide member 22 is preferably mounted upon the end of sprocket 12 but may be located over the end thereof in any other equivalent or suitable manner. The guide member 22 has a guiding surface 22' which slopes toward the periphery of the sprocket 12. This guiding surface 22' also makes acute angle with the axis of said sprocket 12.

The other guide member 23 is fixedly mounted upon the support 10 and performs several important functions. Guide member 23 includes a body portion 24, a mounting flange 25, a central guiding portion 26, and projecting guide portions 27. The mounting flange 25 is attached by means of rivets 28 to the support 10. The body portion 24 prevents the inclined edges 15' of the sprocket teeth 15 from directing the film F too far away from the periphery of the sprocket 12. The central guiding portion 26 is concave and is peripherally concentric with respect to the sprocket 12 and has a guiding surface which is inclined toward the periphery of said sprocket 12. The projecting guiding portions 27 have convex guiding surfaces approximating the outline of guide rollers 20 and located to abut the ends of said guide rollers 20 to prevent axial movement thereof. The guiding surfaces or portions 26 and 27 form a reverse curve and in conjunction with the guiding surface 22' at the end of sprocket 12 form a reverse curve in the film which is being moved laterally or edgewise toward the film moving assembly.

In practice the film strip is threaded into the film moving assembly in the following manner. The film strip F originally approximates a straight line and upon being moved laterally toward said assembly contacts at its inner edge either the guiding surface 22', the concave guiding surfaces on portions 27, or the convex guiding surface on portion 26. If the inner edges of film F contacts guiding surface 22', it will be bent downwardly toward the periphery of sprocket 12 and will be curved similarly to the periphery thereof. The curving of the film F may bring other portions of said film into contact with the concave guiding surfaces on portions 27 and continued edgewise or lateral movement of the film will raise these portions of the film to pass over the ends of guide rollers 20. After the inner edge of the film has passed over the outer edges of sprocket 12 and guide rollers 20, inclined edges 15' of sprocket teeth 15 will cam said inner edge of the film to pass over said teeth 15. Regardless of the sequence of contact of the inner edge of the film with the guiding surfaces on the outer end of the film moving assembly, the film will be curved and properly positioned around the periphery of the sprocket 12 and over the guide rollers 20. A slight longitudinal movement of the film F may be necessary to bring the teeth into registration with the perforations in the film. Thus threading of the film and proper positioning thereof is accomplished merely by moving the film in a lateral direction toward the feeding drum and in some cases longitudinally thereof. The complete threading operation is very simple and can be rapidly performed.

The film F can be readily removed from its threaded position by grasping the projecting ends and pressing them towards each other so that the film bulges outwardly against the body portion 24 and can then be removed axially or laterally away from the sprocket 12. Many modifications of the present invention will be suggested by the foregoing description to those skilled in the art, such modifications, however, are within the scope of the present invention if they are within the purview of the appended claims.

Having thus described my invention, what I declare as new and desire to secure by Letters Patent of the United States is:

1. In an easily threaded film moving assembly the combination with a feeding drum for engaging and moving a film strip, of a pair of guide members for guiding the edge of the film during edgewise threading toward and around the periphery of said drum, one of said members being located at one end of said drum and having a guiding surface sloping toward the periphery of said drum, and the other of said guide members being stationary and located adjacent said drum and having a surface sloping oppositely to the guiding surface on the first-mentioned guide member but also for guiding the edge of said film toward and around the periphery of said feeding drum.

2. In an easily threaded film moving assembly, the combination with a feeding drum for engaging and moving a film strip, and a plurality of guide rollers adjacent said drum and for maintaining said film strip in contact therewith, of a pair of guide members for guiding, during edgewise film threading, the film edge toward and around the periphery of said drum, one of said members being located at one end of said drum and having a guiding surface sloping toward the periphery of said drum, and the other of said guide members being stationary and located adjacent said drum and having a surface which is inclined oppositely to the guiding surface on the first-mentioned guide member, which is reversely curved to extend over the ends of said guide rollers, and which cooperates with said first-mentioned guide member to conduct the edge of the film over the ends of said rollers and feeding drum during edgewise movement of the film during threading.

3. In a sprocket assembly for moving a film strip, the combination with a sprocket mounted for rotation about an axis and having a plurality of teeth, of a pair of guide members for guiding the edge of the film during edgewise threading toward and around the periphery of said sprocket, one of said members being mounted on the end of said sprocket and having a guiding surface sloping toward the periphery of said sprocket, and the other of said guide members being stationary and located adjacent said sprocket and having a surface sloping oppositely to the guiding surface on the first-mentioned guide member but also for guiding the edge of said film toward and around the periphery of said sprocket.

4. In a sprocket assembly for moving a perforated film strip, the combination with a sprocket mounted for rotation about an axis and having a plurality of teeth, with side edges which are inclined at an acute angle to the axis and inclined so that the edge of the film may readily slide laterally over said teeth, of a pair of guide members for guiding the edge of the film during edgewise threading toward and around the periphery of said sprocket, one of said members being mounted on the end of said sprocket and having a guiding surface sloping in the same direction as the side edges of said sprocket teeth and toward the periphery of said sprocket, and the other of said guide members being stationary and located adjacent said sprocket and having a surface sloping oppositely to the guiding surface on the first-mentioned guide member, but also for guiding the edge of said film toward the periphery of said sprocket and the inclined edges of the teeth thereon.

5. In a sprocket assembly for moving a perforated film strip, the combination with a feeding sprocket mounted for rotation about an axis, and a plurality of guides for maintaining the film strip in engagement with said sprocket and for curving said film therearound, of a pair of guide members for engaging the edge of the film and pre-forming the same during lateral edgewise movement into the curved form in which said film engages said sprocket, one of said guide members being mounted at the end of said sprocket and having a guiding surface sloping toward the periphery of said sprocket, and the other of said guide members being stationary and located adjacent said sprocket and having a reversely curved guiding surface sloping oppositely to the guiding surface on the first-mentioned guide member and toward the periphery of said sprocket.

6. In a sprocket assembly for moving a perforated film strip, the combination with a feeding sprocket mounted for rotation about an axis, and a plurality of guides for maintaining the film strip in engagement with said sprocket and for curving said film therearound, of a pair of guide members for engaging the edge of the film and pre-forming the same during lateral edgewise movement into the curved form in which said film engages said sprocket, one of said guide members being mounted at the end of said sprocket and having a guiding surface sloping toward the periphery of said sprocket, and the other of said guide members being stationary and having a guiding surface with concave portion for guiding the edge of the film over one of said guides.

7. In an easily threaded film moving assembly, the combination with a support, a feeding drum rotatably mounted on said support, and a plurality of guide rollers rotatably mounted adjacent said drum and axially movable with respect thereto, of a pair of guide members for guiding, during edgewise film threading, the film edge toward and into position between said feeding drum and said rollers, one of said guide members being located at one end of said drum and having a guiding surface sloping toward the periphery of said drum, and the other of said guide members being attached to said support near said drum, having a guiding surface inclined oppositely to the guiding surface on the first-mentioned guide member, and having a portion for abutting the end of one of said rollers and preventing axial although permitting rotatable movement thereof.

OTTO WITTEL.